United States Patent [19]

Speer

[11] 3,920,497
[45] Nov. 18, 1975

[54] METHOD FOR REPAIRING MATERIALS SUCH AS PLASTICS

[75] Inventor: Lawrence Speer, Amsterdam, N.Y.

[73] Assignee: Vinyltron Corp., Amsterdam, N.Y.

[22] Filed: Apr. 26, 1974

[21] Appl. No.: 464,541

[52] U.S. Cl. ...... 156/94; 260/29.6 RW; 260/29.6 H; 260/42.55; 264/36; 427/140
[51] Int. Cl.² .................................. B32B 35/00
[58] Field of Search ............... 156/94, 98; 117/2 R; 260/29.6 H, 29.6 RB, 29.6 RW, 42.37, 42.53, 42.55; 264/36

[56] References Cited
UNITED STATES PATENTS

| | | |
|---|---|---|
| 3,310,613 | 3/1967 | Lundberg .............................. 264/36 |
| 3,386,929 | 6/1968 | Brunel ......................... 260/29.6 RB |
| 3,563,932 | 2/1971 | Varnagy et al. ................. 260/42.55 |
| 3,654,209 | 4/1972 | Bergmeister et al. ....... 260/29.6 RW |
| 3,673,142 | 6/1972 | Saunders et al. ............ 260/29.6 RW |
| 3,719,517 | 3/1973 | Gladstone et al. ........... 260/29.6 WB |
| 3,804,685 | 4/1974 | Jacoby et al. .......................... 156/98 |

Primary Examiner—Edward G. Whitby
Attorney, Agent, or Firm—Fay & Sharpe

[57] ABSTRACT

A method for patching a damage in flexible plastic or leather-like fabrics employs a special mixture in the patching compound. The mixture gells in the absence of heat and bears the imprint of a vinyl release paper covering the patch during gelling.

6 Claims, 3 Drawing Figures

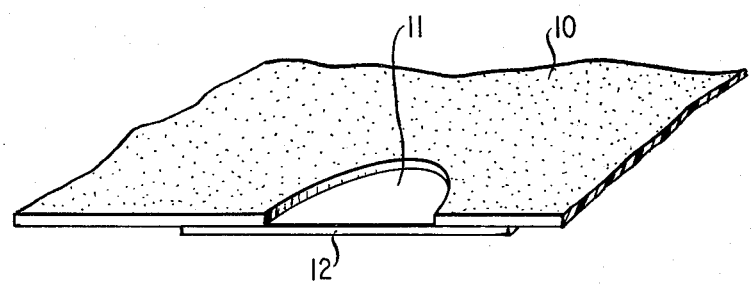

FIG. 1

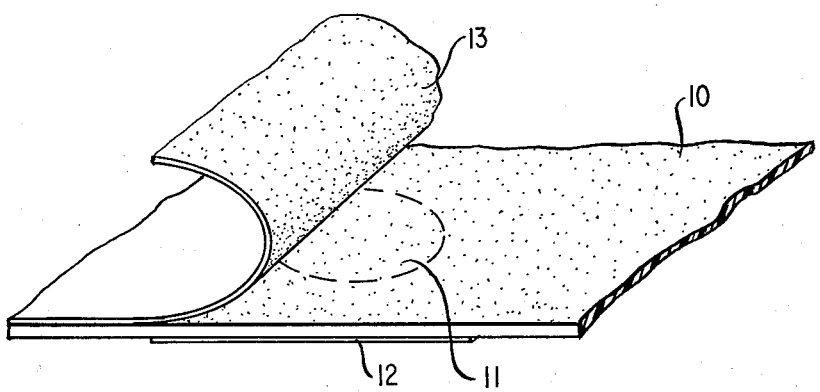

```
┌─────────────────────────┐
│ PLACE BACKING LAYER     │
│ BEHIND DAMAGE           │
└──────────┬──────────────┘
           ▼
┌─────────────────────────┐
│ FILL DAMAGE WITH SPECIAL│
│ PATCHING COMPOUND       │
│ INCLUDING A LIQUID      │
│ VINYL RESIN             │
└──────────┬──────────────┘
           ▼
┌─────────────────────────┐
│ COVER DAMAGE WITH       │
│ RELEASE PAPER           │
└──────────┬──────────────┘
           ▼
┌─────────────────────────┐
│ APPLY PRESSURE          │
└──────────┬──────────────┘
           ▼
┌─────────────────────────┐
│ REMOVE PRESSURE         │
└──────────┬──────────────┘
           ▼
┌─────────────────────────┐
│ REMOVE RELEASE PAPER    │
└─────────────────────────┘
```

METHOD FOR REPAIRING MATERIALS SUCH AS PLASTICS

FIELD OF THE INVENTION

This invention relates to the repair of plastic and leather-like fabrics.

BACKGROUND OF THE INVENTION

A variety of methods are known for the repair of damages to plastic-like fabrics. These processes typically employ a patching compound comprising a mixture of film-forming ingredients such as a vinyl chloride acetate powder and a plasticizer and requires the use of heat to polymerize the patching compound in situ.

In my copending application Ser. No. 319,029, filed Dec. 27, 1972, now U.S. Pat. 3,810,801, a repair procedure is described in which a damaged vinyl material is repaired with a patching compound which requires no heat for gelling. The application describes a special backing material which is employed along with a vinyl release paper to grain the surface of the patch. The gelling process results from a solvent activated adhesive in the backing material.

BRIEF DESCRIPTION OF THE INVENTION

The present invention is directed at a patching procedure which needs neither heat nor the special backing material to patch damaged plastics. In accordance with the present invention, a special mixture of materials results in an air drying patching compound which permits a perfect patch to form even between a sandwich of a vinyl backing material and a vinyl release paper. The mixture comprises a liquid vinyl resin and a filler, preferably a plastisol resin powder.

BRIEF DESCRIPTION OF THE FIGURES

FIGS. 1 and 2 are plan views, partially cut away, of a damaged plastic material prepared for patching and patched, respectively, in accordance with this invention; and FIG. 3 is a flow diagram of a method in accordance with one aspect of this invention.

DETAILED DESCRIPTION

FIG. 1 shows a portion 10 of plastic or leather-like material which includes a damaged area. The damaged area is designated 11 in the figure and is shown trimmed there into a circular shape. A backing material 12 is shown situated under the damage in a manner to form a void into which the special patching compound is disposed.

The backing material may comprise any available material such as a piece of plastic adhesive tape, drill fabric, etc. The material need not be adhesive and may comprise plastic. The patching compound, when gelled, provides sufficient adhesive strength so that no additional adhesive is necessary for the backing material. Typically, the damaged plastic material 10 is affixed to an upholstered piece of furniture and includes sponge rubber therebeneath. This sponge rubber is usually sufficient to maintain a backing material in place beneath the damage, without adhesive, in order to form the void for receiving the patching compound.

The patching compound is next deposited into the void. A spatula is convenient for this step, leaving a generally planar surface when moved over the damage. The filled hole is patched when the patching compound gells. Gelling occurs in air in from a few minutes to about an hour.

If the surface of the damaged material 10 is to be embossed, the embossing is provided on the surface of the patch prior to gelling by bringing a vinyl release paper 13 in contact with the surface of material 10. Conveniently, a flat surface is pressed against paper 13 to form a "mold" with the above-mentioned void, occupied by the patching compound, as the compound gells. The term "vinyl release paper" refers to a coated (release) paper to which vinyl films do not adhere and is commonly used in the manufacture of vinyl films for an embossed surface on those films.

When the pressure is removed and the release paper is lifted from the surface of the patched material, a perfectly grained patch remains. The patch is identified by the broken circle in FIG. 2. FIG. 3 shows a block diagram summarizing the above steps of one method of this invention. It is to be understood that a patch results in accordance with the invention even if a release paper is not pressed against the surface of the patch.

The materials employed in the patching compound, herein, are considered unique. First, the use of a "Latex", a liquid vinyl resin, is considered a significant departure particularly in the patching of damages in flexible plastic materials such as upholstery fabrics. Typically, vinyl resins are not flexible when gelled and require mixing with a plasticizer to obtain flexibility. Moreover, heat is typically required for gelling as is well known. The use of a suspension of a vinyl polymer in water for achieving a flexible patch in the absence of heat provides a considerable advantage as far as convenience and control is concerned. For example, in avoiding the necessity for heat, the prospect of damaging surrounding undamaged material is avoided and no additional heating equipment is necessary.

A liquid vinyl resin typically (Latex) comprises about 55% solid material. Therefore, when the liquid evaporates, a depression occurs in a patched area, filled by the resin above. Consequently, a filler is added to compensate for this shrinkage during gelling. Any finely divided solid which is wet by the liquid vinyl resin is suitable for this purpose. For examle, talc, calcium carbonate, silica, or a "plastisol" resin are suitable. The plastisol resin is a vinyl chloride resin which, contrary to prior art resins requires no heat for gelling when used as a filler in this mixture.

The fillers add body to the patching compound turning the latex liquid into a paste consistency and preventing the above-noted shrinkage during the gelling process. But the plastisol resin is a preferred filler, seemingly expanding during gelling to avoid the shrinkage of the patching compound. Further, the resin provides such a tenatious bond to the materials defining the void into which the compound is placed that the release paper, when used, conveniently has an extra coating of silicone thereon to facilitate release from the patched area. A convenient mixture is 50% plastisol resin and 50% latex liquid by weight and about 45 minutes is allowed for gelling. Any pressure applied to the release paper may be removed promptly. The release paper, on the other hand, should be left in place to avoid damaging the patch surface.

If the patching procedure results in a depressed patch area, the procedure may be repeated. When the patch is completed, however, the surface of the patch may be coated with a coating made by adding a few drops of water to a small portion of the patching compound.

This finish coat is usually brushed onto the patched area and provides an additional color and sheen to the repaired surface.

The patching compound is compatible with known coloring techniques also. Any color presently used in plastics can be matched perfectly by well-known additives to the patching compound. These additives are in wide spread use in the manufacture of plastic materials of a wide variety of colors and are not described further herein.

On small damages in plastic fabrics particularly, the patching compound can be employed without a backing material and without using a release paper.

In one specific example of this invention a mixture of the latex, a polyvinyl chloride in water was mixed with the plastisol resin powder in a slow dispersion paddle mixer. The mixture was a 50%-50% mixture by weight. A damaged plastic material was repaired by this resulting patching compound by inserting a piece of plastic adjacent the underside of the damage, by filling the void with the patching compound and by pressing a vinyl release paper against the patching compound. The release paper was removed after 45 minutes. A completely gelled patch was formed.

The liquid vinyl resin employed in the patching compound in accordance with this invention is a latex paint. It is considered particularly novel herein to employ such a material for patching damages in flexible plastic materials. Successful patching of such damages depends on the thickening added to the liquid vinyl resin to attain the "body" comparable to the material patched. Therefore, the combination of ingredients for providing a tenatious flexible vinyl film suitable for, for example, the repair of vinyl upholstery goods is also considered a significant departure from prior art teachings. The use of the vinyl release paper to conform the repaired area to the undamaged material completes the mold for the patching compound and results in a grained and matching flexible vinyl repair.

The patching compound permits an air dried patching system for vinyl upholstery fabrics which avoids the necessity for heat and thus avoids the resulting hazards as well. The compound also gells without the necessity for special backing materials and adhesive thus permitting a simple, inexpensive, and easily employed home repair procedure.

What is claimed is:

1. A method for patching damage in a plastic or leather-like material comprising the steps of
   a. placing a backing material against said damage thus forming a defined void in said material,
   b. filling said void with a patching compound comprising a film forming latex polymer in water and a finely divided solid filler which is wet by said liquid, and
   c. permitting said patching compound to gell in said void.

2. A method for patching damage in a plastic material in accordance with claim 1 wherein said film forming latex polymer in water is a liquid vinyl resin and said filler is a plastisol resin.

3. A method in accordance with claim 1 which also comprises the steps of pressing a vinyl release paper against said patching compound after it is placed in said void for a time sufficient to permit the gelling of said patching compound and thereafter removing said paper.

4. A method in accordance with claim 1 wherein said finely divided solid filler is an inorganic material selected from the group consisting of talc, calcium carbonate, silica and mixtures thereof.

5. A method in accordance with claim 1 wherein said latex polymer is polyvinyl chloride.

6. A method in accordance with claim 1 wherein said patching compound comprises, in weight percent, about 50 percent latex polymer and about 50 percent filler.

* * * * *